United States Patent [19]

Clark

[11] Patent Number: 5,188,390

[45] Date of Patent: Feb. 23, 1993

[54] SUSPENSION SYSTEM HAVING ACTIVE AND PASSIVE MODES

[75] Inventor: William M. Clark, West Bloomfield Township, Oakland County, Mich.

[73] Assignee: Ford Motor Company, Dearborn, Mich.

[21] Appl. No.: 808,317

[22] Filed: Dec. 16, 1991

[51] Int. Cl.$^5$ ............................................. B60G 11/26
[52] U.S. Cl. ..................................... 280/707; 280/714; 364/424.05
[58] Field of Search .............................. 280/707, 714; 364/424.05

[56] References Cited

U.S. PATENT DOCUMENTS

| | | | |
|---|---|---|---|
| 4,145,067 | 5/1979 | Ceriani | 280/276 |
| 4,368,900 | 1/1983 | Beusse | 280/707 |
| 4,665,440 | 4/1987 | Eckert | 358/213.29 |
| 4,743,000 | 5/1988 | Karnopp | 267/218 |
| 4,753,328 | 6/1988 | Williams et al. | 188/299 |
| 4,786,034 | 11/1988 | Heess et al. | |
| 4,787,650 | 11/1988 | Doi et al. | 280/707 |
| 4,892,328 | 1/1990 | Kurtzman et al. | 280/707 |
| 4,902,034 | 2/1990 | Maguran et al. | 280/707 |
| 4,953,890 | 9/1990 | Kamimura | 280/707 |
| 4,998,163 | 8/1990 | Kikushima et al. | 280/707 |
| 5,013,061 | 5/1991 | Fujimura et al. | 280/707 |
| 5,041,977 | 8/1991 | Kazunobu | 364/424.05 |
| 5,042,833 | 8/1991 | Kazunobu | 280/707 |

FOREIGN PATENT DOCUMENTS

| | | |
|---|---|---|
| 0027869 | 8/1980 | European Pat. Off. |
| 0032158 | 2/1981 | European Pat. Off. |
| 0089794 | 3/1983 | European Pat. Off. |
| 3638574A | 5/1988 | Fed. Rep. of Germany |
| 3742883A | 7/1989 | Fed. Rep. of Germany |
| 2251451 | 1/1973 | France |
| 5660711 | 5/1981 | Japan |
| 58-10581 | 3/1983 | Japan |
| 58-85705 | 5/1983 | Japan |
| 59-53223 | 3/1984 | Japan |
| 59-63212 | 4/1984 | Japan |
| 63-14181 | 4/1988 | Japan |
| 623759 | 8/1978 | U.S.S.R. |
| 793823 | 1/1981 | U.S.S.R. |
| 2068308 | 8/1981 | United Kingdom |

Primary Examiner—Kenneth R. Rice
Attorney, Agent, or Firm—Raymond L. Coppiellie; Roger L. May

[57] ABSTRACT

The present invention is a suspension unit having active and passive modes, for a vehicle suspension system, having a fluid source for providing a pressurized fluid. The suspension unit comprises a fluid actuator, a fluid spring, and fluid connecting means for coupling the fluid source to the fluid actuator. The suspension unit further includes mode selection means coupled to the fluid connecting means for responsively selecting the mode of the suspension unit, first valve means coupled to the mode selection means for providing fluid communication between the fluid spring and the fluid actuator in the active mode, and second valve means coupled to the fluid connecting means between the fluid spring and the fluid actuator in the active mode for providing fluid communication between the fluid spring and the fluid actuator in the passive mode.

25 Claims, 6 Drawing Sheets

SUSPENSION SYSTEM HAVING ACTIVE AND PASSIVE MODES

BACKGROUND OF THE INVENTION

This present invention relates to actively controlled suspension systems and, in particular, to a suspension system having an active mode and a passive mode.

Active suspension systems are known to those skilled in the art. In general, active suspension systems control a vehicle's "ride" and "handling". Active suspension systems control the vehicle's "ride" and "handling" by controlling and maintaining the vehicle's attitude, for example, elevation, roll and pitch. Active suspension systems sense the attitude of the car and, in response, provide power to or remove power from actuators to maintain and control the "ride" and "handling" of the vehicle. For example, Williams et al., U.S. Pat. No. 4,625,993, teaches of a conventional active suspension system intended to maintain a vehicle substantially stable in all planes of movement irrespective of any external forces acting upon the vehicle.

Active suspension systems, for example, in automobiles and the like, include a pressurized fluid source and suspension units. The pressurized fluid source, for example, a hydraulic pump, provides fluid power in the form of a pressurized working fluid to the suspension unit at each vehicle wheel. The suspension units dissipate and/or counteract undesirable external forces.

When there is a failure in the suspension system, for example, an interruption in fluid communication between the pump and the suspension units, the suspension units are unable to function in the active mode. If the suspension system is to provide any suspension at all after loss of the active mode, the suspension system will be required to function in a passive mode as a passive-like suspension system.

In addition to a loss of the active mode, an interruption in fluid communication between the pump and the suspension units can cause serious damage to various elements of the suspension system. The pump communicates with each of the suspension units through conduits, for example, a main conduit coupled to the pump and secondary conduits which "feed off" the main conduit and supply each suspension unit with the pressurized fluid. An interruption in fluid communication can result from a break in the main conduit which would lead to a complete loss of fluid in each of the suspension units. This would cause serious damage to various elements of the suspension units as well as the pump.

To prevent such damage and still provide suspension for the vehicle, the suspension units include protection and bypass valves. For example, active suspension systems like the system disclosed in West German patent DE 3638-574A employ a 3-port, two state, switching valve and a 4-port, two state, power valve in an entirely hydraulic system. These valves are configured such that if there is a loss of hydraulic pressure or if there is an electrical power failure, the hydraulic pump is disconnected from the suspension unit and a fluid restrictor is incorporated between the two chambers of the double-acting cylinder to provide resistance to fluid flow between the chambers. In this configuration, the suspension functions in a passive mode.

A suspension system like the system disclosed in Doi et al, U.S. Pat. No. 4,787,650, utilizes a hydropneumatic spring, hydraulic actuator and valve configuration to control the damping characteristics of the suspension system. The Doi et al system increases or decreases the damping characteristics of the suspension system according to the vehicle's current "ride" and "handling" characteristics measured by acceleration detecting devices and vehicle attitude sensing devices. The damping characteristics of the suspension system are adjusted by opening or closing electromagnetic valves, which provide resistance to fluid flow, in the fluid paths between the hydropneumatic spring and hydraulic actuator.

Suspension systems like the system disclosed in Doi et al are single mode suspension systems. These type systems are often designed for active or semi-active modes of operation. The Doi et al type system does not, on the occurrence of some type of suspension system failure, modify its mode of operation from an active or semi-active mode to a passive-type mode.

There exists a need for a hydropneumatic suspension system to provide a default operating characteristic similar to conventional passive suspension systems.

SUMMARY OF THE INVENTION

In a first principal aspect, the present invention is a suspension unit, having active and passive modes, for a vehicle suspension system, having a fluid source for providing a pressurized fluid. The suspension unit comprises a fluid actuator, a fluid spring, fluid connecting means for coupling the fluid source to the fluid actuator, and mode selection means, coupled to the fluid connecting means, for responsively selecting the mode of the suspension unit. The suspension unit also includes first valve means, coupled to the mode selection means, for providing fluid communication between the fluid spring and the fluid actuator when the suspension unit is in the active mode, and second valve means, coupled between the fluid spring and the fluid actuator, for providing fluid communication between the fluid spring and the fluid actuator when the suspension unit is in the passive mode.

In another principle aspect, the present invention is an hydropneumatic suspension unit, having active and passive modes, for a vehicle suspension system, having a fluid source for providing a pressurized fluid. The suspension unit comprising a fluid actuator coupled to the fluid source, a fluid spring having first and second chambers, and mode selection means for responsively selecting the mode of the suspension unit. The suspension unit also includes first valve means, coupled to the mode selection means, for providing fluid communication between the fluid actuator and the first chamber of the fluid spring when the suspension unit is in the active mode, and second valve means, coupled to the fluid source and the fluid actuator, and interposed between the fluid actuator and the second chamber of the fluid spring, for providing fluid communication between the fluid actuator and the second chamber when the suspension unit is in the passive mode.

In another principle aspect, the present invention is a valve apparatus for a suspension unit, having active and passive modes, a fluid actuator, and a fluid spring, having first and second chambers, of a suspension system, having a fluid source for providing a pressurized fluid. The valve apparatus comprises, a mode selection valve, coupled to the fluid source and the fluid actuator, and a first damping mechanism, coupled to the mode selection valve and the fluid source to provide resistance to fluid flow between the fluid actuator and the first chamber of the fluid spring when the suspension unit is in the active mode. The valve apparatus also includes a second damping mechanism, coupled to the fluid actuator and the second chamber of the fluid spring, to provide resistance to fluid flow between the fluid actuator and the second chamber of the fluid spring when the suspension unit is in the passive mode.

BRIEF DESCRIPTION OF THE DRAWINGS

In the course of the detailed description of preferred embodiments to follow, reference will be made to the attached drawings, in which.

DESCRIPTION OF THE PREFERRED EMBODIMENTS

Figure 1:
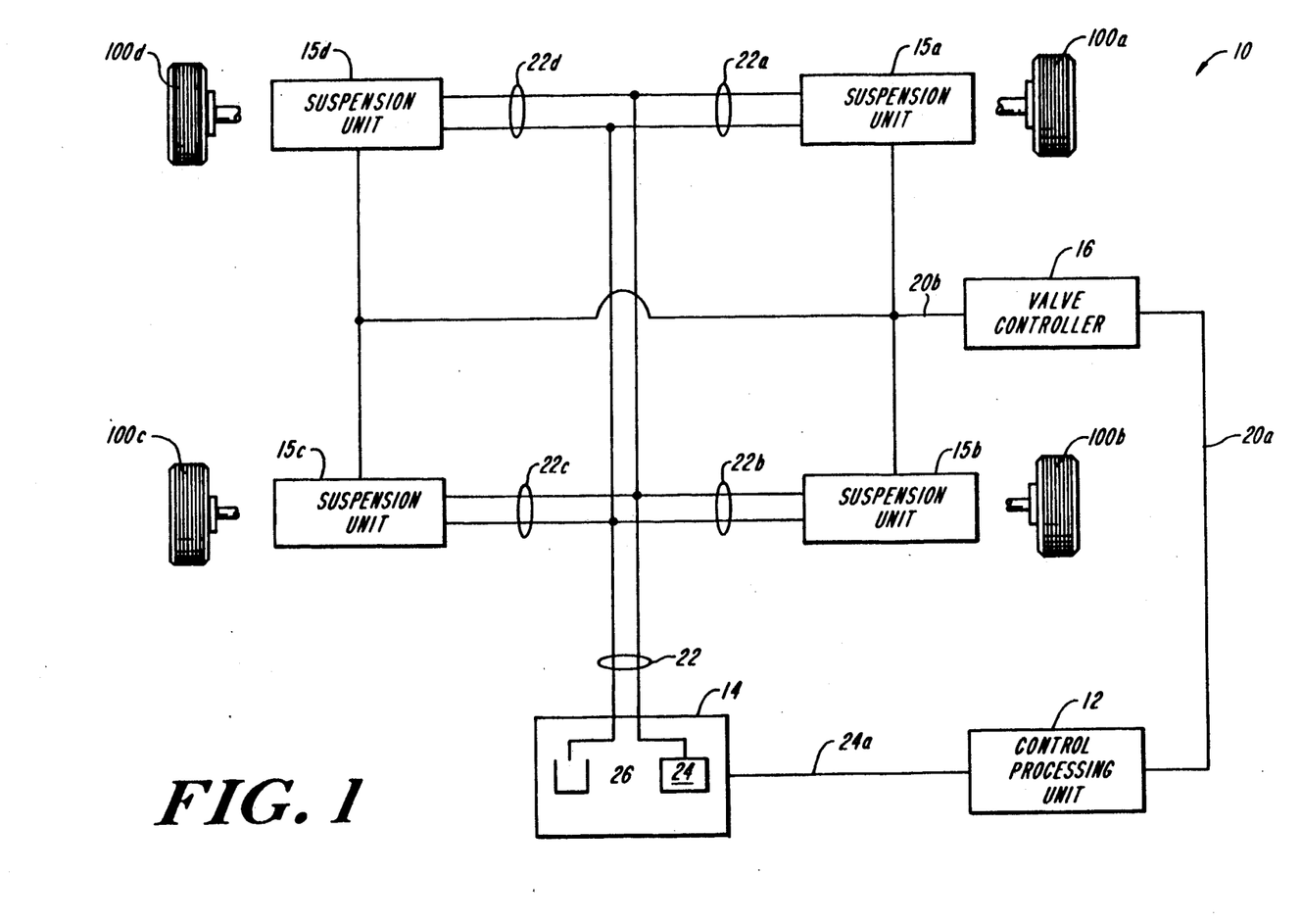
FIG. 1 is a functional schematic block diagram representation of a suspension system according to the present invention.

The schematic block diagram in FIG. 1 is an illustration of a suspension system 10 according to the present invention. The suspension system 10 employs a central processing unit 12 to coordinate the overall operation of the suspension system 10, including monitoring the various elements of suspension system 10 to detect off-design operating parameters such as system fluid pressure, vehicle height, and/or control response.

Briefly, the suspension system 10 includes two separate non-mutually exclusive modes of operation, an active mode and a passive mode. When portions of the suspension system 10 are in the active mode, they function as an active suspension. When portions of the suspension system 10 are in the passive mode, they function much like a passive suspension. Some portions of the suspension system 10 may be functioning in the active mode when others are functioning in the passive mode.

In the illustrative embodiment, the suspension system 10 includes four suspension units 15a–d, one for each vehicle wheel 100a–d, respectively. When the suspension system 10 is in the active mode, the central processing unit 12 calculates and transmits a body force command to the suspension units 15a–d. The central processing unit 12 utilizes information from several accelerometers (not shown) and possibly other vehicle attitude sensors to generate the body force command. As is well known, the body force command is the suspension information required at each suspension unit 15a–d necessary to respond to accelerations of the vehicle body 102.

When the suspension system 10 or a suspension unit or units 15a–d is in the passive mode, it is functioning much like a conventional "shock absorber" suspension system. However, it will become readily apparent that the central processing unit 12 may have control over the amount of damping provided by the suspension units 15a–d in the passive mode.

The central processing unit 12 communicates with the suspension units 15a–d through a valve controller 16. The central processing unit 12 provides valve control signals to the valve controller 16 which, in turn, controls the valves in the suspension units 15a–d. The central processing unit 12 communicates with the valve controller 16 over multiconductors 20a. The valve controller 16 communicates with the suspension units 15a–d over multi-conductors 20b. It should be noted that the function of the valve controller 16 may be fully incorporated within the central processing unit 12. Under these conditions, the central processing unit 12 would not require a controller to interface with the suspension units 15a–d.

The suspension units 15a–d obtain fluid power from a fluid providing unit 14. The fluid providing unit 14 includes a pump 24, a reservoir 26, and fluid pressure and flow sensors (not shown). The pump 24 may be, for example, hydraulic or pneumatic type. In a preferred embodiment, the pump 24 is a hydraulic type pumping mechanism. The active suspension system 10 employs the pump 24 to provide hydraulic fluid at a substantially constant flow rate. The pump 24, in a preferred embodiment, supplies the necessary flow rate to maintain a substantially constant pressurized fluid at about 2200 psi in the fluid conduit 22. The fluid providing unit 14 communicates with the suspension units 15a–d via fluid conduits 22a–d, respectively.

The fluid pressure sensors provide the central processing unit 12 with signals indicative of the pressure of the fluid in the fluid conduit 22. The fluid flow sensors provide the central processing unit 12 with signals indicative of the rate of fluid flow in the fluid conduit 22. The central processing unit 12 communicates with the fluid providing unit 14 over multi-conductors 24a.

It should be noted that the fluid providing unit 14, as well as the suspension units 15a–d, may employ accumulators to accumulate the pressurized fluid in fluid conduits 22 and 22a–d. The accumulators retain the fluid at a relatively constant pressure.

The central processing unit 12, in addition to providing body force commands to the suspension units 15a–d, monitors the conditions of suspension system 10 to detect abnormal or undefined conditions in the fluid providing unit 14 and the suspension units 15a–d. The central processing unit 12 converts the suspension unit or units 15a–d into the passive mode when conditions are not normal or defined, i.e. an off-design condition. Abnormal or undefined operating conditions or parameters may be characterized generally as off-design conditions. Off-design conditions result when some portion, or the total, of the system 10 is not functioning as intended. For example, the system fluid pressure or control response is not operating within defined operating parameters.

In the preferred embodiments of FIGS. 2–6, each suspension unit 15a–d is substantially identical in function. Each suspension unit 15a–d may vary to accommodate packaging or space constraints. Further, each suspension unit 15a–d may vary to provide a desired range of forces due to vehicle weight distribution. FIGS. 2–6 provide a more detailed schematic representation of one of the suspension units 15a–d, particularly suspension unit 15a, in conjunction with the central processing unit 12, the fluid providing unit 14, and the valve controller 16.

Figure 2:
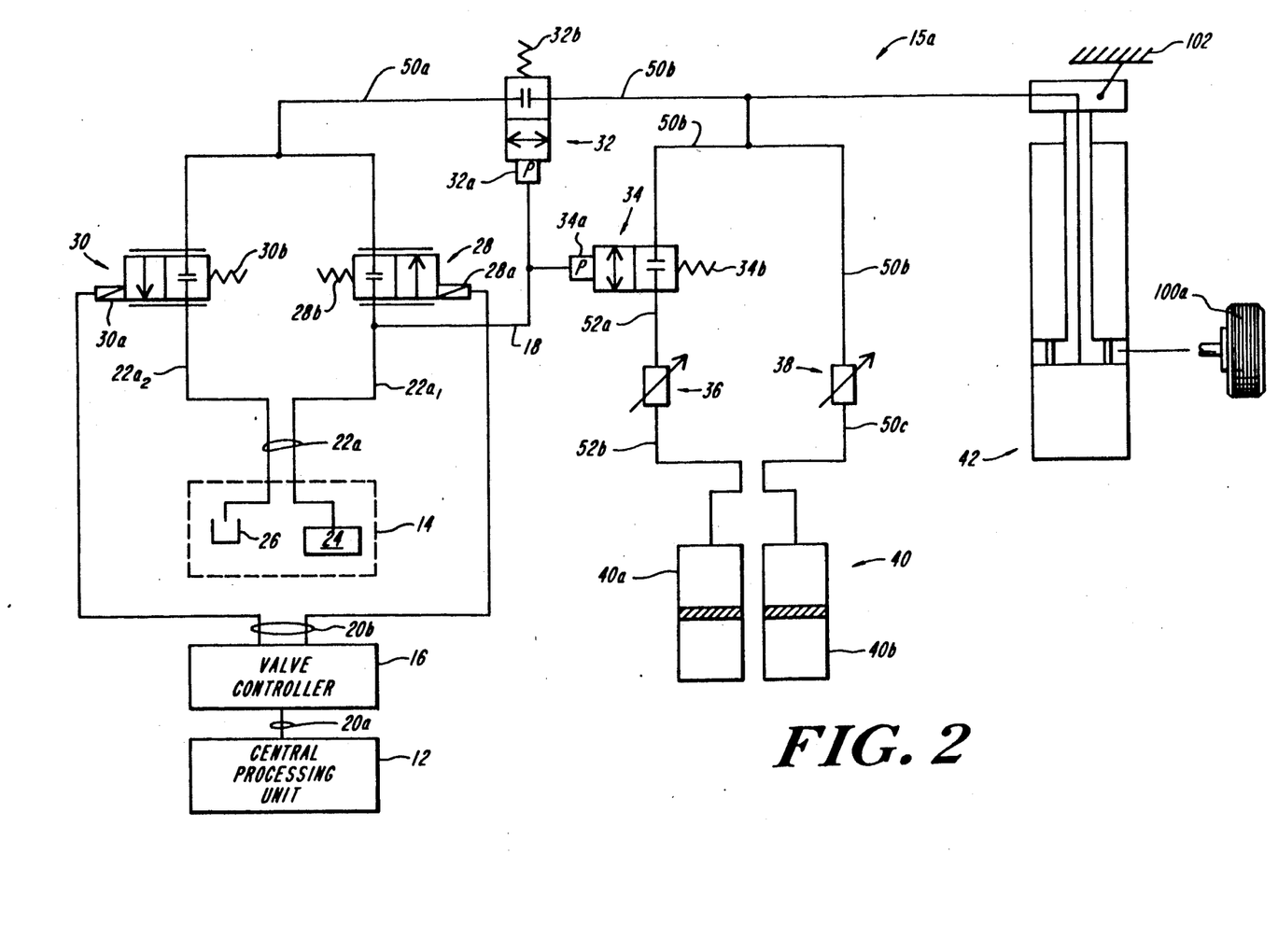
FIG. 2 is a detailed schematic representation of a preferred embodiment of a suspension unit of the suspension system of FIG. 1.

Referring now to FIG. 2, in a first preferred embodiment, the suspension unit 15a includes a fill active control valve 28, a vent active control valve 30, an isolation valve 32, a mode select valve 34, a first damping valve and orifice 36, and a second damping valve and orifice 38. A detailed discussion of the operation of the suspension system 10 follows a brief description of the elements of the suspension unit 15a immediately below.

The fill active control valve 28 is a 2-port electronically controlled, continuously adjustable, solenoid valve. The fill active control valve 28, when actuated, couples the fluid conduits $22a_1$ to conduit 50a to provide fluid communication between the isolation valve 32 and the pump 24. The fill active control valve 28, in its completely unactuated state interrupts fluid communication between the pump 24 and the isolation valve 32.

The vent active control valve 30 is also a 2-port electronically controlled, continuously adjustable, solenoid vale. The vent active control valve 30, when actuated, couples the fluid conduits $22a_2$ to conduit 50a to provide fluid communication between the isolation valve 32 and the reservoir 26. The vent active control valve 28, in its completely unactuated state, interrupts fluid communication between the reservoir 26 and the isolation valve 32.

The fill and vent active control valves 28 and 30, respectively, are responsive to commands from the central processing unit 12. The fill and vent active control valves 28 and 30 utilize proportional mechanisms 28a and 30a, respectively, to respond to electrical signals from the central processing unit 12 via the valve controller 16. When the suspension unit 15a is in the active mode, the fill and vent control valves 28 and 30, respectively, respond to commands from the valve controller 16 which is responsive to the body force commands from the central processing unit 12. The fill control valve 28 and the vent control valve 30 responsively open or close to add or remove fluid from the suspension unit 15a.

When the suspension unit 15a is in the passive mode, the central processing unit 12 instructs the fill and vent control valves 28 and 30, respectively, to close, i.e. maintain its normally closed position. The control valves 28 and 30 include spring mechanisms 28b and 30b, respectively, which force the valve spool of each control valve 28 and 30 into the "default state" or closed position. As a result, in the absence of a signal otherwise, the spring mechanisms 28a and 28b force the valve spools of the control valves 28 and 30, respectively, into a closed state.

The isolation valve 32 is a 2-port, pressure actuated, normally closed valve. It is well known that this means that there is no fluid communication through the valve unless it is actuated. The isolation valve 32 is a two state device and in its actuated state, couples the fluid conduits 50a and 50b to permit fluid communication between the suspension unit 15a and the fluid providing unit 14. The isolation valve 32, in its unactuated state, uncouples the fluid conduits 50a and 50b to interrupt fluid communication between the suspension unit 15a and the fluid providing unit 14. When the isolation valve 32 is in its unactuated state, the suspension unit 15a is in the passive mode. In this state, the isolation valve 32 fluidly isolates the suspension unit 15a.

It should be noted that the isolation valve 32 is a somewhat redundant isolating valve. When the suspension unit 15a is in the passive mode, the control valves 28 and 30 should be closed making the isolation by the isolation valve 32 somewhat redundant.

Further, it should be noted that the normally closed state of the isolation valve 32 of FIGS. 2-6 may, alternatively, be a check-valve arrangement. Under these circumstances, the isolation valve 32 would preclude fluid flow from the suspension unit 15a to the fluid providing unit 14. However, the isolation valve 32 would permit fluid flow from the fluid providing unit 14 towards the suspension unit 15a.

The isolation valve 32 is switched between states by a pressure actuated switching mechanism 32a, for example, a pilot valve switching mechanism. The pressure actuated switching mechanism 32a is responsive to the fluid pressure in the fluid conduit 18. The pressure actuated switching mechanism 32a switches the isolation valve 32 between states depending upon the pressure of the fluid in the fluid conduits 18 and $22a_1$.

The pressure necessary to cause the switching mechanism 32a to actuate the isolation valve 32 depends upon the pressure "sensitivity rating" of the switching mechanism 32a. In a preferred embodiment, when the substantially constant pressurized fluid is maintained at about 2200 psi in the fluid conduit 18, the switching mechanism 32a switches the isolation valve 32 between states at about 500 psi.

It should be noted that fluid conduit 18 is a conduit that "feeds off" of the fluid conduit $22a_1$. The fluid conduit 18 has characteristics substantially similar to the fluid conduit $22a_1$, including for example, fluid pressure. The fluid pressure, and fluctuations thereof, in fluid conduit 18 are substantially similar to that in the fluid conduit $22a_1$.

The mode selection valve 34 is also a 2-port, pressure actuated, normally closed valve. The mode selection valve 34 is a two state device and in its actuated state, couples the fluid conduits 50b and 52a. When the mode selection valve 34 is in its actuated state the suspension unit 15a is in the active mode and fluid communication is provided between fluid actuator 42 and fluid spring 40 through the fluid path of fluid conduits 50b, 52a, and 52b. The mode selection valve 34, in its unactuated state, uncouples the fluid conduits 50b and 52a. When the mode selection valve 34 is in its unactuated state, the suspension unit 15a is in the passive mode.

The mode selection valve 34, like the isolation valve 32, is a pressure actuated valve. The mode selection valve 34 is switched between states by a pressure actuated switching mechanism 34a. The pressure actuated switching mechanism 34a is responsive to the fluid pressure in the fluid conduit 18. The pressure actuated switching mechanism 34a switches the mode selection valve 34 between states depending upon the pressure of the fluid in the fluid conduit 18.

In a preferred embodiment, when the substantially constant pressurized fluid is maintained at about 2200 psi in the fluid conduit $22a_1$, the switching mechanism 34a switches the mode selection valve 34 between states at about 500 psi. The pressure at which the switching mechanism switches is often called the switching pressure threshold.

The isolation valve 32 and the mode selection valve 34 further include a spring mechanism 32b and 34b, respectively. The spring mechanism 32b and 34b force the valve spool of the isolation valve 32 and the mode selection valve 34, respectively, into the "default state" or normally closed position. As a result, in the absence of a sufficient fluid pressure in the fluid conduit 18 necessary to switch switching mechanisms 32a and 34a, the spring mechanisms 32b and 34b force the valve spool of the control valves 32 and 34, respectively, into the normally closed position.

The first damping valve and orifice 36 is a passive damping mechanism that provides resistance to fluid flow therethrough. In a preferred embodiment, the resistance to fluid flow provided by the first damping valve and orifice 36 is nonlinear. The resistance to fluid flow depends upon the velocity of the fluid flow therethrough.

The first damping valve and orifice 36 is incorporated within the fluid communication path between the fluid spring 40 and the fluid actuator 42 in the active mode only. The mode selection valve 34 is actuated in the active mode thereby coupling the first damping valve and orifice between the fluid spring 40 and fluid cylinder 42. In the passive mode, the mode selection valve 34 is in its unactuated state and the first damping valve and orifice 36 is not incorporated within the fluid communication path.

The second damping valve and orifice 38, like the first damping valve and orifice 36, is a passive damping mechanism that provides resistance to fluid flow. In a preferred embodiment, the resistance to fluid flow provided by the second damping valve and orifice 38 is also nonlinear. The second damping valve and orifice 38 is incorporated within the fluid communication path in both the active and passive modes. In the passive mode, however, the second damping valve and orifice 38 is the only damping mechanism coupled in the fluid communication path between the fluid spring 40 and the fluid actuator 42. When the suspension unit 15a is in the passive mode, its damping is determined and dependent upon the fluid damping provided by the second damping valve and orifice 38.

In a preferred embodiment, the first damping valve and orifice 36 is designed to provide less resistance to fluid flow than the second damping valve and orifice 38. As a result, when the suspension unit 15a is in the active mode, the majority of fluid flows through the first damping valve and orifice 36 when it is displaced by the fluid spring 40 and/or the fluid actuator 42. When the suspension unit 15a is in the passive mode, as mentioned above, the mode selection valve 34 removes the first damping valve and orifice 36 from the fluid communication path thereby forcing all fluid flow through the second damping valve and orifice 38. In a preferred embodiment, the first damping valve and orifice 36 is a type deflected disk, manufactured by Tokico America or Monroe Corporation. The second damping valve and orifice 38, in a preferred embodiment, is also a type deflected disk, manufactured by Tokico America or Monroe Corporation.

The suspension unit 15a further includes a fluid spring 40, for example, a hydropneumatic gas spring. In a preferred embodiment, the fluid spring 40 includes two chambers 40a and 40b to provide dissipation of the fluid energy created by the suspension unit 15a. The chamber 40a is coupled to fluid conduit 52b. The chamber 40b is coupled to fluid conduit 50c. It should be noted that chambers 40a and 40b need not be equal size chambers but may differ according to the spring rate desired in the various modes. The fluid spring 40, in a preferred embodiment, is a type nitrogen gas spring, manufactured by Tokico America or United Technologies Corporation.

It should be noted that the suspension unit 15a may also employ a fluid spring having a single chamber. Under these circumstances, the conduits 50c and 52b are coupled into the single chamber fluid spring to provide dissipation of the fluid energy created by the suspension unit 15a.

The suspension unit 15a also includes a fluid actuator 42, for example, a single acting hydraulic actuator. The fluid actuator 42 is mechanically coupled to the vehicle body 102 and the vehicle wheel 100a. The fluid actuator 42 is fluidly coupled to the remaining elements of the suspension unit 15a through the fluid conduit 50b. In operation, when the vehicle wheel 100a is displaced relative to the vehicle body 102, fluid is displaced relative thereto in fluid conduit 50b. In a preferred embodiment, the fluid actuator 42 is a type macpherson strut or shock absorber manufactured by Tokico America or Monroe Corporation.

With continued reference to FIG. 2, in operation, the suspension unit 15a reverts to a passive mode when the active mode characteristics are not within design parameters. For instructional purposes, the operation of the suspension system 10 is described for an off-design condition which is characterized by a loss of pressurized fluid communication between the fluid providing unit 14 and a suspension unit 15a. This may occur, for example, when the pump 28 malfunctions or the fluid conduit 22 or 22a₁ is severed. Under these conditions, the suspension system 10, or a portion thereof, reverts into the passive mode.

When the suspension unit 15a experiences a loss in pressurized fluid communication with the pump 24, the isolation valve 32 and the mode selection valve 34 automatically de-actuate when the fluid pressure in fluid conduit 18 drops below the switching pressure threshold. The isolation valve 32 disconnects the suspension unit 15a from the fluid providing unit 14, trapping the remaining fluid in the suspension unit 15a. In this state, the suspension unit 15a is fluidly isolated from the remaining elements of the suspension system 10 regardless of the state or condition of the fill active control valve 28 and/or the vent active control valve 30.

When the mode selection valve 34 de-actuates and closes, it precludes fluid communication, through the first damping valve and orifice 36, between the fluid spring 40 and the fluid actuator 42. The fluid communication is maintained between the fluid spring 40 and fluid actuator 42 through the second damping valve and orifice 38. The second damping valve and orifice 38 provides resistance to fluid flow therethrough. As a result, the damping provided by the suspension unit 15a and the spring rate are solely determined and dependent upon the second damping valve and orifice 38. In this state, the suspension unit 15a is operating in the passive mode as a passive suspension.

Figure 3:
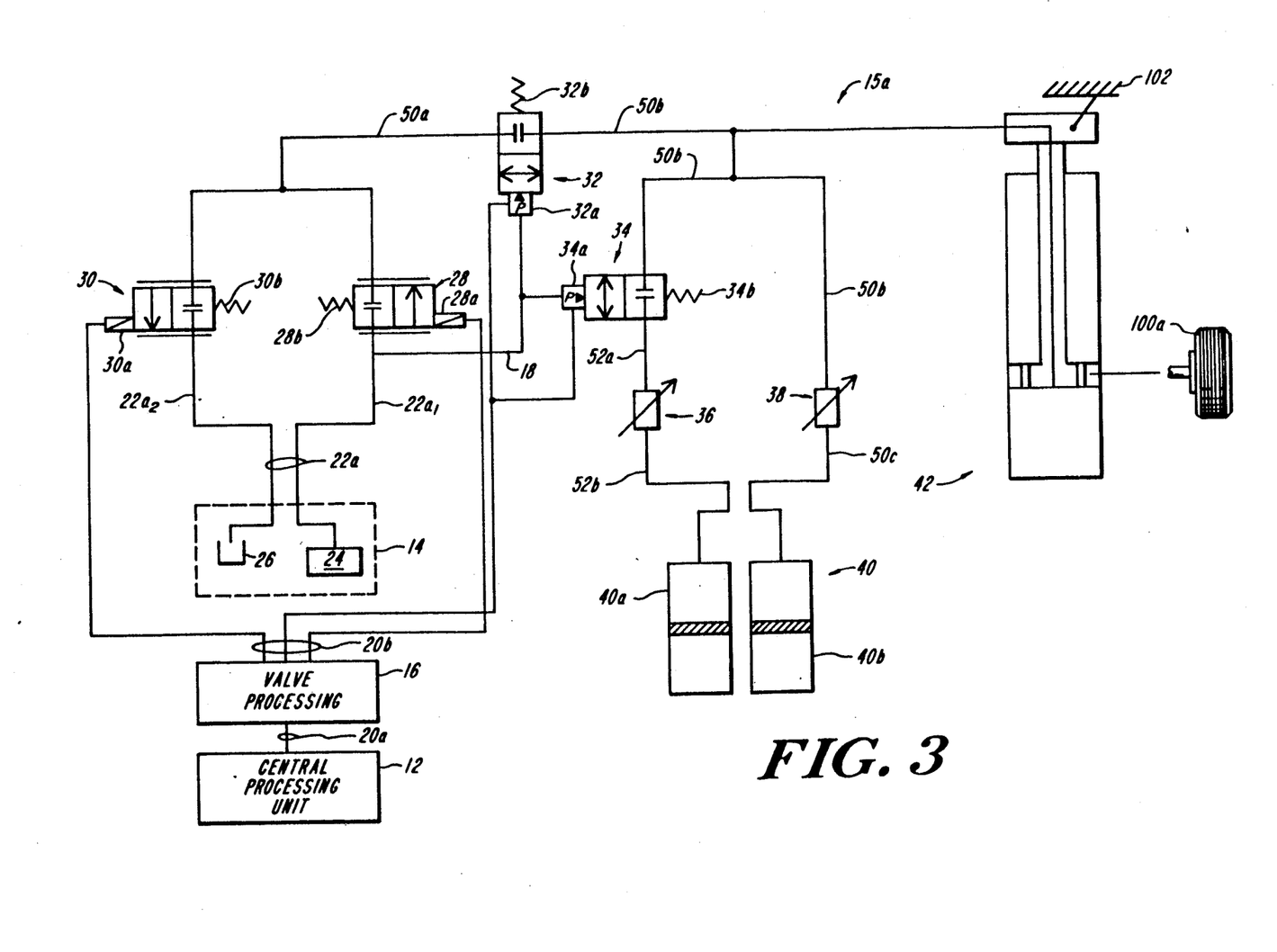
FIG. 3 is a detailed schematic representation of another preferred embodiment of a suspension unit of the suspension system of FIG. 1.

Referring now to FIG. 3, in another preferred embodiment, the suspension unit 15a includes a fill active control valve 28, a vent active control valve 30, a isolation valve 32, a mode select valve 34, an first damping valve and orifice 36, a second damping valve and orifice 38, a fluid spring 40, and a fluid actuator 42. The fill active control valve 28, the vent active control valve 30, the first damping valve and orifice 36, the second damping valve and orifice 38, the fluid spring 40, and the fluid actuator 42 are similar to the devices having the same drawing reference characters in FIG. 2. These elements were discussed in detail above and therefore will not be discussed in detail below.

In this preferred embodiment, the switching mechanism 32a of the isolation valve 32 and the switching mechanism 34a of the mode selection valve 34 include a solenoid operated pilot stage in addition to a pressure actuating mechanism. Having this type of switching mechanism, the isolation valve 32 and the mode selection valve 34 are pressure actuatable as well as electrically actuatable. The isolation valve 32 and the mode selection valve 34, are responsive, as detailed in the previous embodiment, to pressure of the fluid in the fluid conduit 18.

The isolation valve 32 and the mode selection valve 34 may also be actuated by an electrical command from the valve controller 16. The solenoid operated pilot stage 32a and 34a of the isolation valve 32 and the mode selection valve 34, respectively, respond to electrical signals from the valve controller 16. The valves 32 and 34 switch between the two states in response to electrical signals from the valve controller 16. The valve controller 16 communicates with the isolation valve 32 and the mode selection valve 34 over multiconductors 20b.

The operation of the suspension system 10 is described immediately below. For instructional purposes, the suspension system 10 may experience generally two types of off-design conditions. In a first type of off-design condition, the suspension system 10 reverts into the passive mode when there is inadequate fluid pressure from fluid providing unit 14, for example, a loss of pressurized fluid communication much like the embodiment of FIG. 2. In operation, when there is a loss of fluid pressure in fluid conduit 22$a_1$, the isolation valve 32 and mode selection valve 34 automatically revert into the unactuated state. As mentioned above, when the isolation valve 32 is in the unactuated state, the suspension unit 15a is fluidly isolated from the remaining elements of the suspension system 10 regardless of the state or condition of the fill active control valve 28 and/or the vent active control valve 30.

When the mode selection valve 34 de-actuates and closes, it precludes fluid communication through the first damping valve and orifice 36. The fluid communication is maintained between the fluid spring 40 and fluid actuator 42 through the second damping valve and orifice 38. The second damping valve and orifice 38 provide resistance to fluid flow therethrough. As mentioned above, the damping of the suspension unit 15a is solely determined and dependent upon the second damping valve and orifice 38. In this state, the suspension unit 15a is operating in the passive mode as a passive suspension.

In a second type of off-design condition, the suspension unit 15a is directed into a passive suspension mode by the central processing unit 12. In those instances where the off-design condition does not impact the fluid pressure in fluid conduits 18 and 22$a_1$, for example when the active control valve 28 malfunctions, the central processing unit 12 instructs the valve controller 16 to de-actuate the isolation valve 32 and the mode selection valve 34. In response, the isolation valve 32 isolates the suspension unit 15a from the remaining elements of the suspension system 10 and the mode selection valve 34 removes the first damping and orifice 36 from the fluid communication path between the fluid spring 40 and the fluid actuator 42. The second damping and orifice 38 provides the damping for the suspension unit 15a by providing resistance to fluid flow between the fluid spring 40 and the fluid actuator 42. In this state, the suspension unit 15a again operates in the passive mode as a passive suspension.

Figure 4:
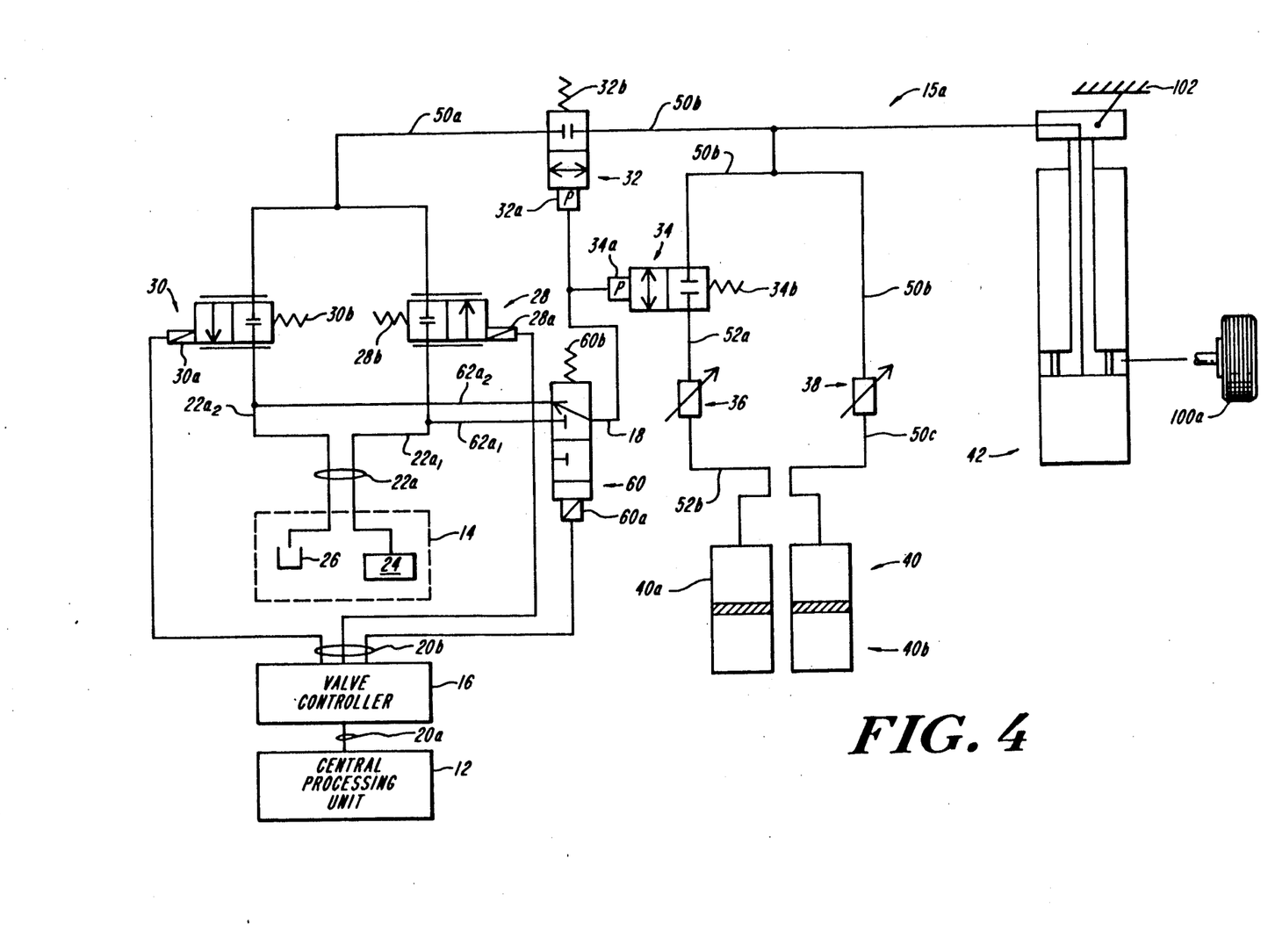
FIG. 4 is a detailed schematic representation of another preferred embodiment of a suspension unit of the suspension system of FIG. 1.

Referring now to FIG. 4, in another preferred embodiment, the suspension unit 15a includes a fill active control valve 28, a vent active control valve 30, a isolation valve 32, a mode select valve 34, a first damping valve and orifice 36, a second damping valve and orifice 38, a fluid spring 40, and a fluid actuator 42. The suspension unit 15a further includes an actuating valve 60. It should be noted that, as with the embodiment of FIG. 3, only the isolation valve 32, the mode selection valve 34 and the actuating valve 60 are discussed in detail below. The other elements were discussed in detail above and therefore will not be discussed in detail below.

In this preferred embodiment, the isolation valve 32 and the mode selection valve 34 are pressure actuated valves. The isolation valve 32 and the mode selection valve 34 are substantially similar to the isolation valve and mode selection valve of the embodiment of FIG. 2. The isolation valve 32 and the mode selection valve 34 are switched between states by a pressure actuated switching mechanism 32a and 34a, respectively. The pressure actuated switching mechanisms 32a and 34a switch the valves 32 and 34, respectively, between states depending upon the pressure of the fluid in the fluid conduit 18.

The actuating valve 60 is a 3-port electronically controlled valve. The actuating valve 60 is a two state device and in its actuated state, couples the fluid conduits 22$a_1$ and 62a to the conduit 18. The actuating valve 60, in its unactuated state, uncouples the fluid conduit 22$a_1$ and 62$a_1$ from the conduit 18 and couples the fluid conduit 22$a_2$ and 62$a_2$ to the conduit 18. The fluid conduit 22$a_2$ is coupled to the reservoir 26 and contains fluid whose pressure is insufficient to actuate the protection and mode selection valves 32 and 34, respectively.

The actuating valve 60 is responsive to commands from the central processing unit 12. The actuating valve 60 utilizes solenoid mechanisms 60a to respond to electrical signals from the central processing unit 12 via the valve controller 16. When the suspension unit 15a is in the active mode, the central processing unit 12 instructs the actuating valve 60 to remain in the actuated state. When the suspension unit 15a is in the passive mode, the central processing unit 12 instructs the actuating valve 60 to close, i.e. remain in its normally closed position. The actuating valve 60 is responsive to signals from the central processing unit 12, via the valve controller 16, over multi-conductors 20b.

The actuating valve 60 further includes a spring mechanism 60b. The spring mechanism 60b forces the valve spool of the actuating valve 60 into the "default state" or normally closed position. As a result, the spring mechanism 60b forces the valve spool of the actuating valve 60 into the normally closed position in the absence of an electrical signal from the valve controller 16.

When the actuating valve 60 is in its actuated state, the isolation valve 32 and mode selection valve 34 are actuated provided there is sufficient fluid pressure in fluid conduit 22$a_1$. When the actuating valve 60 is in its unactuated state, the isolation valve 32 and the mode selection valve 34 are each forced into an unactuated state. In the unactuated state, as mentioned above, the isolation valve 32 fluidly isolates the suspension unit 15a and the mode selection valve 34 removes the first damping and orifice 36 from the fluid communication path between the fluid spring 40 and the fluid actuator 42.

In operation, the suspension unit 15a reverts to, or is directed into, a passive mode when the active mode experiences an off-design condition. For instructional purposes, the off-design conditions may be generally of three types. In a first type, the suspension unit 15a reverts into the passive mode when there is a loss of pressurized fluid communication between the fluid providing unit 14 and the suspension unit 15a. When there is a loss of fluid pressure in fluid conduit $22a_1$, the isolation valve 32 and mode selection valve 34 automatically revert into the unactuated state as a result of an insufficient pressure to actuate the switching mechanism 32a and 34a, respectively. As mentioned above, the isolation valve 32 fluidly isolates the remaining elements of the suspension system 10.

When the mode selection valve 34 de-actuates, it precludes fluid communication through the first damping valve and orifice 36. The fluid communication is maintained between the fluid spring 40 and fluid actuator 42 through the second damping valve and orifice 38. The second damping valve and orifice 38 provides resistance to fluid flow therethrough. In this state, the suspension unit 15a is operating in the passive mode as a passive suspension.

In the second type of off-design condition, the isolation valve 32 and mode selection valve 34 automatically revert into the unactuated state when the system 10 experiences a loss of electrical power. Under these conditions, the actuating valve 60 reverts to its unactuated state and the fluid conduit 18 is coupled to the fluid conduit $22a_2$ thereby causing isolation valve 32 and mode selection valve 34 to de-actuate. In this state, the suspension unit 15a is fluidly isolated and functions as disclosed above.

In a third type of off-design condition, the suspension unit 15a is directed into a passive suspension mode by the central processing unit 12. In those instances when the central processing unit 12 detects a off-design condition in the suspension system 10 which does not impact the fluid pressure in fluid conduit $22a_1$, for example, when the active control valve 28 malfunctions, the central processing unit 12 commands the valve controller 16 to de-actuate the actuating valve 60. In response, the actuating valve 60 disconnects the fluid conduits 22a and 62a from the fluid conduit 18 causing isolation valve 32 and the mode selection valve 34 to deactuate. The isolation valve 32 isolates the suspension unit 15a from the remaining elements of the suspension system 10 and the mode selection valve 34 removes the first damping and orifice 36 from the fluid communication path. Fluid communication is maintained between the fluid spring 40 and fluid actuator 42 through the second damping valve and orifice 38. In this state, the suspension unit 15a is again operating in the passive mode as a passive suspension.

Figure 5:
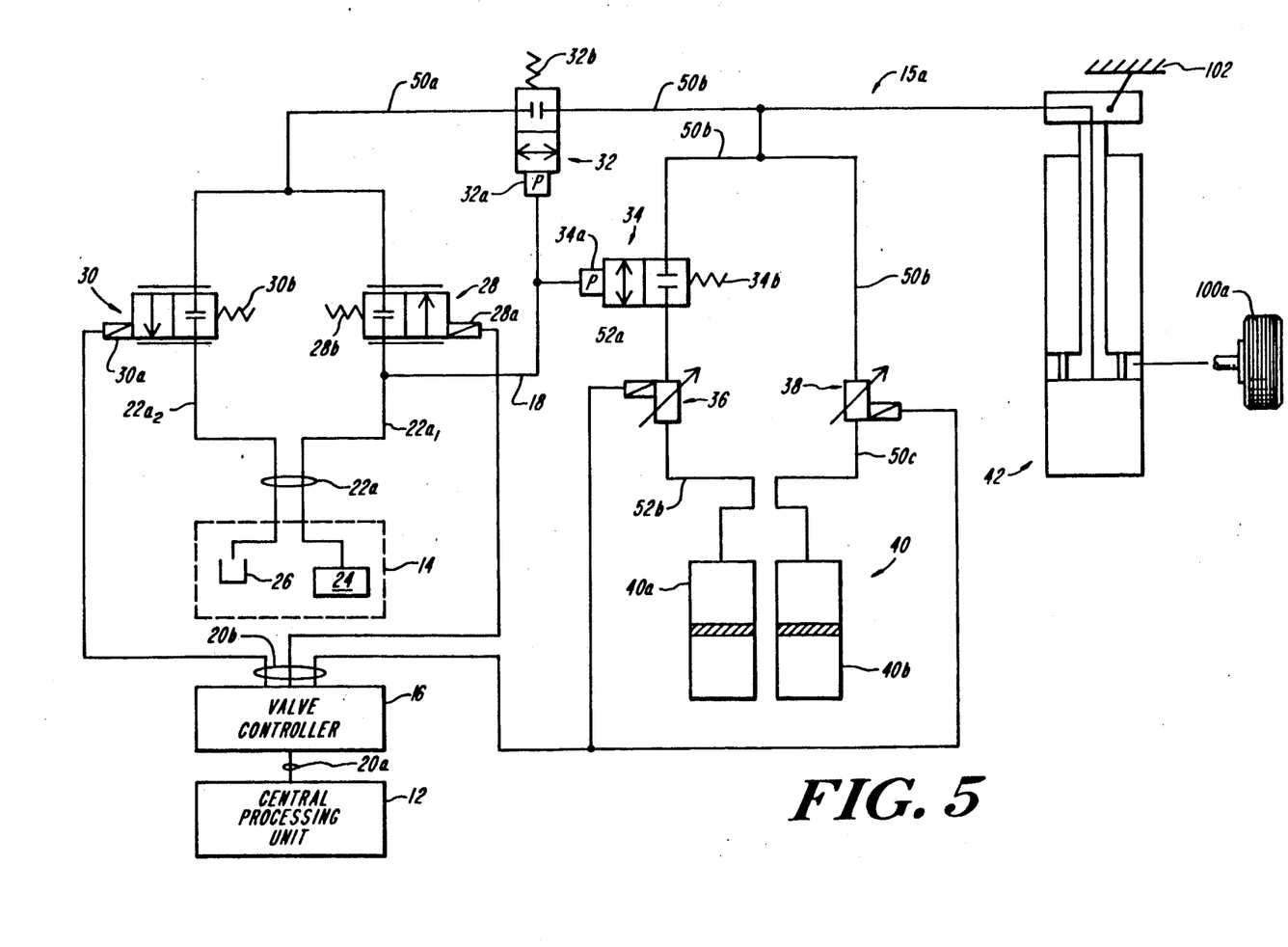
FIG. 5 is a detailed schematic representation of another preferred embodiment of a suspension unit of the suspension system of FIG. 1.

Referring now to FIG. 5, in another preferred embodiment, the suspension unit 15a includes a fill active control valve 28, a vent active control valve 30, a isolation valve 32, a mode select valve 34, a first damping valve and orifice 36, a second damping valve and orifice 38, a fluid spring 40, and a fluid actuator 42. It should be noted that only the first damping valve and orifice 36 and the second damping valve and orifice 38 are discussed in detail below since the other elements are substantially similar to the elements having the identical drawing reference characters of the embodiment of FIG. 2.

In this embodiment, the first damping valve and orifice 36 and the second damping valve and orifice 38 each permit the resistance to fluid flow to be modified electronically. In each case, the diameter of the orifice of the damping valve and orifice incorporated within the fluid path is adjusted by electrical signals from the central processing unit 12, via the valve controller 16, over multi-conductors 20b. Under these circumstances, the first damping valve and orifice 36 and the second damping valve and orifice 38 function much like proportional type valves in permitting the amount of fluid restriction to be electronically adjusted.

In operation, while in the active mode, the central processing unit 12 may adjust the amount of fluid resistance provided by the first damping valve and orifice 36 and/or the second damping valve and orifice 38. This allows the central processing unit 12 to adjust the quantity of damping provided by the suspension unit 15a in addition to controlling the fill active control valve 28 and the vent active control valve 30.

When the suspension unit 15a encounters an off-design condition, the suspension unit 15a responds much like the embodiment of FIG. 2. In operation, however, the central processing unit 12 may adjust the amount of fluid resistance provided by the second damping valve and orifice 38 when in the passive mode. The central processing unit 12 utilizes information from various sensors to calculate the suspension response necessary at each wheel to preserve the desired "ride" of the vehicle. The central processing unit 12 calculates a suspension response required at the suspension unit 15a to respond to changes in the position of the vehicle body 102 relative to the vehicle wheels 100a–d. The central processing unit 12 then calculates, in response to the current conditions measured and the current relative displacement of the wheels 100a–d from the vehicle body 102, the adjustments the valve controller 16 must make to the second damping valve and orifice 38 in order to achieve a desired response. The valve controller 16 then adjusts the amount of resistance to fluid flow introduced by the second damping valve and orifice 38.

Figure 6:
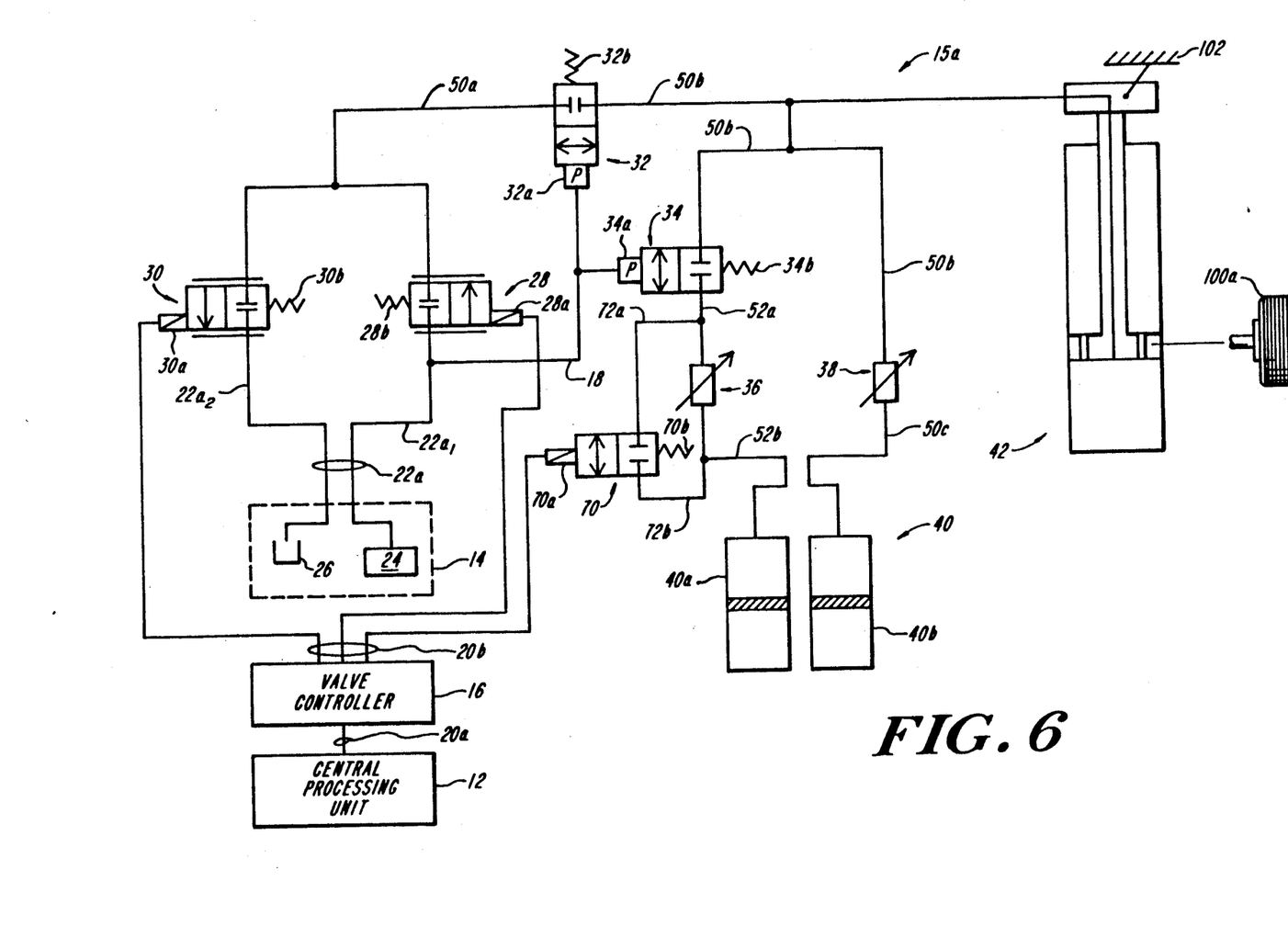
FIG. 6 is a detailed schematic representation of another preferred embodiment of a suspension unit of the suspension system of FIG. 1.

Referring now to FIG. 6, in another preferred embodiment, the suspension unit 15a includes a fill active control valve 28, a vent active control valve 30, a isolation valve 32, a mode select valve 34, a first damping valve and orifice 36, a second damping valve and orifice 38, a fluid spring 40, and a fluid actuator 42. The suspension unit 15a further includes a damping selection valve 70. It should be noted that only the damping selection valve 70 and the first damping valve and orifice 36 and are discussed in detail below since the other elements are substantially similar to the embodiment of FIG. 2.

In this embodiment, the damping selection valve 70 is a 2-port electronically controlled, two state, solenoid valve. The damping selection valve 70 is designed to select the damping mechanism, and thereby the damping introduced, when the suspension unit 15a is in the active mode. The damping selection valve 70, when actuated, couples the fluid conduits 52a to conduit 52b through conduits 72a and 72b to substantially by-pass the first damping valve and orifice 36. The damping selection valve 70, in its completely unactuated state, forces the pressurized fluid to flow through the first damping valve and orifice 36. The damping selection valve 70 is responsive to signals from the valve controller 16 over multi-conductors 20b.

The damping selection valve 70 utilizes solenoid mechanisms 70a to respond to electrical signals from the central processing unit 12, via the valve controller 16. When the suspension unit 15a is in the active mode, the central processing unit 12 instructs the damping selection valve 70 to remain in the actuated state when the fluid damping provided by the first damping and orifice 36 is desired. Alternatively, the central processing unit 12 instructs the damping selection valve 70 to close, i.e. remain in its normally closed position when the fluid damping provided by the second damping and orifice 38 is desired.

The damping selection valve 70 further includes a spring mechanism 70b. The spring mechanism 70b forces the valve spool of the damping selection valve 70 into the "default state" or normally closed position in the absence of an electrical signal from the valve controller 16.

In operation, the suspension unit 15a responds to an off-design condition much like the embodiment of FIG. 2. However, in this type of configuration, the central processing unit 12 may select the amount of damping provided in the active mode. When the damping selection valve 70 is unactuated, fluid is forced to flow through the first damping and orifice 36 which provides resistance to fluid flow. When the damping selection valve 70 is actuated, the substantial portion of fluid flow is through the damping selection valve 70 which provides nominal resistance to fluid flow.

As mentioned previously, the first damping valve and orifice 36 may be designed to provide less resistance to fluid flow than the second damping valve and orifice 38. Under these circumstances, the majority of fluid flow is through the first damping valve and orifice 36 when it is not de-coupled from the fluid communication path by the damping selection valve 70.

Various preferred embodiments of the present invention have been described. It is understood, however, that changes and modifications can be made without departing from the true scope and spirit of the present invention as defined by the following claims, which are to be interpreted in view of the foregoing. For example, the various valves of the suspension unit 15a may be configured in several fashions. In FIGS. 26 the mode selection valve 34, the first and second damping valve and orifice 36 and 38, respectively, and the fluid spring 40 are illustrated as being interposed between the isolation valve 32 and the fluid actuator 42. The fluid actuator 42 may be interposed between the isolation valve 32 and the mode selection valve 34, the first and second damping valve and orifice 36 and 38, respectively, and the fluid spring 40.

Further, the mode selection valve 34 and the first damping valve and orifice 36 may be configured in reverse order. The first damping valve and orifice 36 may be interposed between fluid conduits 50b and 52a, and mode selection valve 34 interposed between fluid conduits 52a and 52b.

What is claimed is:

1. A suspension unit having active and passive modes for a vehicle suspension system having a fluid source for providing a pressurized fluid, said suspension unit comprising:
   a fluid actuator;
   a fluid spring;
   mode selection means coupled to said fluid actuator and said fluid spring for responsively selecting said mode of said suspension unit;
   first valve means coupled to said mode selection means for restricting fluid communication between said fluid spring and said fluid actuator when said suspension unit is in said active mode; and
   second valve means coupled to said fluid spring and said fluid actuator for restricting fluid communication between said fluid spring and said fluid actuator when said suspension unit is in said passive mode.

2. The suspension unit of claim 1 wherein said mode selection means has first and second states and includes switching means for responsively switching said mode selection means between said first and second states and wherein said suspension unit is in said passive mode when said mode selection means is in said first state and in said active mode when said mode selection means is in said second state.

3. The suspension unit of claim 2 wherein said switching means is operative to switch said mode selection means between said first and second states in response to an electrical signal.

4. The suspension unit of claim 2 wherein said switching means is operative to switch said mode selection means between said first and second states in response to a predetermined fluid pressure.

5. The suspension unit of claim 4 further including valve actuating means having first and second states for coupling said pressurized fluid to said switching means of said mode selection means in said second state and uncoupling said pressurized fluid in said first state.

6. The suspension unit of claim 2 further including isolation valve means having first and second states for coupling said pressurized fluid to said suspension unit in said second state and uncoupling said pressurized fluid from said suspension unit in said first state.

7. The suspension unit of claim 6 wherein said isolation valve means includes switching means for switching said isolation valve means between said first and second states in response to an electrical signal.

8. The suspension unit of claim 6 wherein said isolation valve means includes switching means for switching said isolation valve means between said first and second states in response to a predetermined fluid pressure.

9. The suspension unit of claim 8 wherein said switching means of said mode selection means is operative to switch said mode selection means between said first and second states in response to said predetermined fluid pressure and wherein said suspension unit further includes valve actuating means having first and second states for coupling said pressurized fluid to said switching means of said mode selection means and said switching means of said isolation valve means in said second state and uncoupling them from said pressurized fluid in said first state.

10. The suspension unit of claim 1 wherein said first and second valve means are deflecting disk damping valves.

11. The suspension unit of claim 10 wherein said restriction to fluid flow is adjustable.

12. A hydropneumatic suspension unit having active and passive modes for a vehicle suspension system having a fluid source for providing a pressurized fluid, said hydropneumatic suspension unit comprising:
   a fluid actuator coupled to said fluid source;
   a fluid spring having first and second chambers;
   mode selection means for responsively selecting said mode of said suspension unit;
   first valve means coupled to said mode selection means for restricting fluid communication between said fluid actuator and said first chamber of said fluid spring when said suspension unit is in said active mode; and second valve means coupled to said fluid spring and said fluid actuator for restricting fluid communication between said fluid actuator and said second chamber when said suspension unit is in said passive mode.

13. The suspension unit of claim 12 wherein said mode selection means has first and second states and includes switching means for responsively switching said mode selection means between said first and second states wherein suspension unit is in said passive mode when said mode selection means is in said first state and in said active mode when said mode selection means is in said second state.

14. The suspension unit of claim 13 wherein said switching means is operative to switch said mode selection means between said first and second states in response to an electrical signal.

15. The suspension unit of claim 13 wherein said switching means is operative to switch said mode selection means between said first and second states in response to a predetermined fluid pressure.

16. The suspension unit of claim 15 further including valve actuating means having first and second states for coupling said pressurized fluid to said switching means of said mode selection means in said second state and uncoupling said pressurized fluid from said switching means of said mode selection means in said first state.

17. The suspension unit of claim 13 wherein said first and second valve means are deflecting disk damping valves.

18. The suspension unit of claim 17 wherein said restriction to fluid flow is adjustable.

19. The suspension unit of claim 13 further including isolation valve means having first and second states for coupling said pressurized fluid to said suspension unit in said second state and uncoupling said pressurized fluid from said suspension unit in said first state.

20. The suspension unit of claim 19 wherein said isolation valve means further includes switching means for switching said isolation valve means between said first and second states in response to an electrical signal.

21. The suspension unit of claim 19 wherein said isolation valve means further includes switching means for switching said isolation valve means between said first and second states in response to a predetermined fluid pressure.

22. A valve apparatus for a hydropneumatic suspension unit having active and passive modes, a fluid actuator, and a fluid spring having first and second chambers, of a suspension system having a fluid source for providing a pressurized fluid, said valve apparatus comprising:
a mode selection valve coupled to said fluid source and said fluid actuator;
a first damping mechanism coupled to said mode selection valve to provide resistance to fluid flow between said fluid actuator and said first chamber of said fluid spring when said apparatus is in said active mode; and
a second damping mechanism coupled to said fluid actuator and said second chamber of said fluid spring to provide resistance to fluid flow between said fluid actuator and said second chamber when said apparatus is in said passive mode.

23. The valve apparatus of claim 22 wherein said mode selection valve has first and second states and includes a pressure responsive switching mechanism for switching said mode selection valve between said first and second states in response to a predetermined fluid pressure and wherein suspension unit is in said passive mode when said mode selection means is in said first state and in said active mode when said mode selection means is in said second state.

24. The valve apparatus of claim 23 further including an isolation valve having first and second states for coupling said pressurized fluid to said valve apparatus in said second state and uncoupling said pressurized fluid from said valve apparatus in said first state.

25. The valve apparatus of claim 24 further including an actuating valve having first and second states for coupling said pressurized fluid to said mode selection valve and said isolation valve in said second state and uncoupling said pressurized fluid from said mode selection valve and said isolation valve in said first state.

* * * * *